(12) United States Patent
Akhavain Mohammadi

(10) Patent No.: US 10,972,904 B2
(45) Date of Patent: *Apr. 6, 2021

(54) HANDLING MOBILE DEVICE ADMINISTRATION IN ANCHORLESS MOBILE NETWORKS

(71) Applicant: HUAWEI TECHNOLOGIES CO., LTD., Shenzhen (CN)

(72) Inventor: Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,734

(22) Filed: Oct. 1, 2018

(65) Prior Publication Data

US 2019/0045356 A1 Feb. 7, 2019

Related U.S. Application Data

(63) Continuation of application No. 15/666,208, filed on Aug. 1, 2017, now Pat. No. 10,091,645.

(51) Int. Cl.
*H04W 48/16* (2009.01)
*H04W 8/24* (2009.01)
(Continued)

(52) U.S. Cl.
CPC ............. *H04W 8/24* (2013.01); *H04W 48/16* (2013.01); *H04W 88/16* (2013.01); *H04W 92/20* (2013.01)

(58) Field of Classification Search
CPC ................................. H04W 8/24; H04W 48/16
See application file for complete search history.

(56) References Cited

U.S. PATENT DOCUMENTS 8,565,689 B1 * 10/2013 Rubin .................. H04B 17/382
455/67.11
2011/0021184 A1 1/2011 Bouguen
(Continued)

FOREIGN PATENT DOCUMENTS

CN 102027800 A 4/2011
CN 102711241 A 10/2012
(Continued)

OTHER PUBLICATIONS

3GPP TR 23.705 V13.0.0 (Dec. 2014), 3rd Generation Partnership Project; Technical Specification Group Services and System Aspects; Study on system enhancements for user plane congestion management (Release 13), Dec. 2014, pp. 1-62. XP050923741.
(Continued)

*Primary Examiner* — Lakeram Jangbahadur

(57) ABSTRACT

A method in an access node of a Mobile network. The method comprises: maintaining, by the access node, device administration data pertaining to a mobile electronic device, the device administration data including at least one statistic pertaining to traffic to and from the mobile electronic device, and at least one rule for controlling an operation of the mobile electronic device; updating, by the access node, the at least one statistic based on the traffic to and from the mobile electronic device; enforcing, by the access node, the at least one rule based on the at least one statistic; and synchronizing, by the access node, the device administration data pertaining to the mobile electronic device with corresponding second device administration data maintained by a second access node of the Mobile network.

15 Claims, 7 Drawing Sheets

(51) Int. Cl.
*H04W 88/16* (2009.01)
*H04W 92/20* (2009.01)

(56) References Cited

U.S. PATENT DOCUMENTS

| | | | |
|---|---|---|---|
| 2014/0362807 A1* | 12/2014 | Bhatnagar | H04L 61/2592 |
| | | | 370/329 |
| 2016/0073365 A1 | 3/2016 | Klockar | |
| 2016/0381573 A1 | 12/2016 | Roeland et al. | |
| 2017/0079059 A1 | 3/2017 | Li | |
| 2017/0339014 A1* | 11/2017 | Smith | H04L 5/0058 |

FOREIGN PATENT DOCUMENTS

| | | | |
|---|---|---|---|
| CN | 104662994 A | 5/2015 |
| CN | 105657813 A | 6/2016 |
| CN | 105744575 A | 7/2016 |
| CN | 106716886 A | 5/2017 |

OTHER PUBLICATIONS

3GPP TS 38.423 V0.1.1 (Jun. 2017); 3rd Generation Partnership Project; Technical Specification Group Radio Access Network; NG Radio Access Network(NG-HAN); Xn application protocol (XnAP) (Release 15), Jun. 2017. pp. 1-53, XP051298776.

* cited by examiner

HANDLING MOBILE DEVICE ADMINISTRATION IN ANCHORLESS MOBILE NETWORKS

CROSS REFERENCE TO RELATED APPLICATIONS

This application is a continuation of U.S. patent application Ser. No. 15/666,208 filed Aug. 1, 2017, issued on Oct. 2, 2018 as U.S. Pat. No. 10,091,645, the contents of which are incorporated herein by reference.

FIELD OF THE INVENTION

The present invention pertains to the field of Communication networks, and in particular to Handling Mobile Device administration in anchorless Mobile Networks.

BACKGROUND

Mobile Back-Haul networks typically depend on an anchor node, such as either one or both of a Service Gateway (SGW) and a Packet Gateway (PGW) to provide device administration services (such as traffic monitoring, policy enforcement, and generating reports for customer billing) pertaining to mobile electronic devices.

So-called anchorless networks have been proposed, but these proposals do not provide any means by which the device administration services may be maintained.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method in an access node of a Mobile network. The method comprises: maintaining, by the access node, device administration data pertaining to a mobile electronic device, the device administration data including at least one statistic pertaining to traffic to and from the mobile electronic device, and at least one rule for controlling an operation of the mobile electronic device; updating, by the access node, the at least one statistic based on the traffic to and from the mobile electronic device; enforcing, by the access node, the at least one rule based on the at least one statistic; and synchronizing, by the access node, the device administration data pertaining to the mobile electronic device with corresponding second device administration data maintained by a second access node of the Mobile network.

BRIEF DESCRIPTION OF THE FIGURES

Further features and advantages of the present invention will become apparent from the following detailed description, taken in combination with the appended drawings, in which.

DETAILED DESCRIPTION

In the following description, features of the present invention are described by way of example embodiments. For convenience of description, these embodiments make use of features and terminology known from 4G and 5G networks as defined by the Third Generation Partnership Project (3GPP). However, it shall be understood that the present invention is not limited to such networks. Rather, methods and systems in accordance with the present invention may be implemented in any network in which a mobile device may connect to the network through at least one access point, and subsequently be handed-off to at least one other access point during the course of a communications session.

Figure 1:
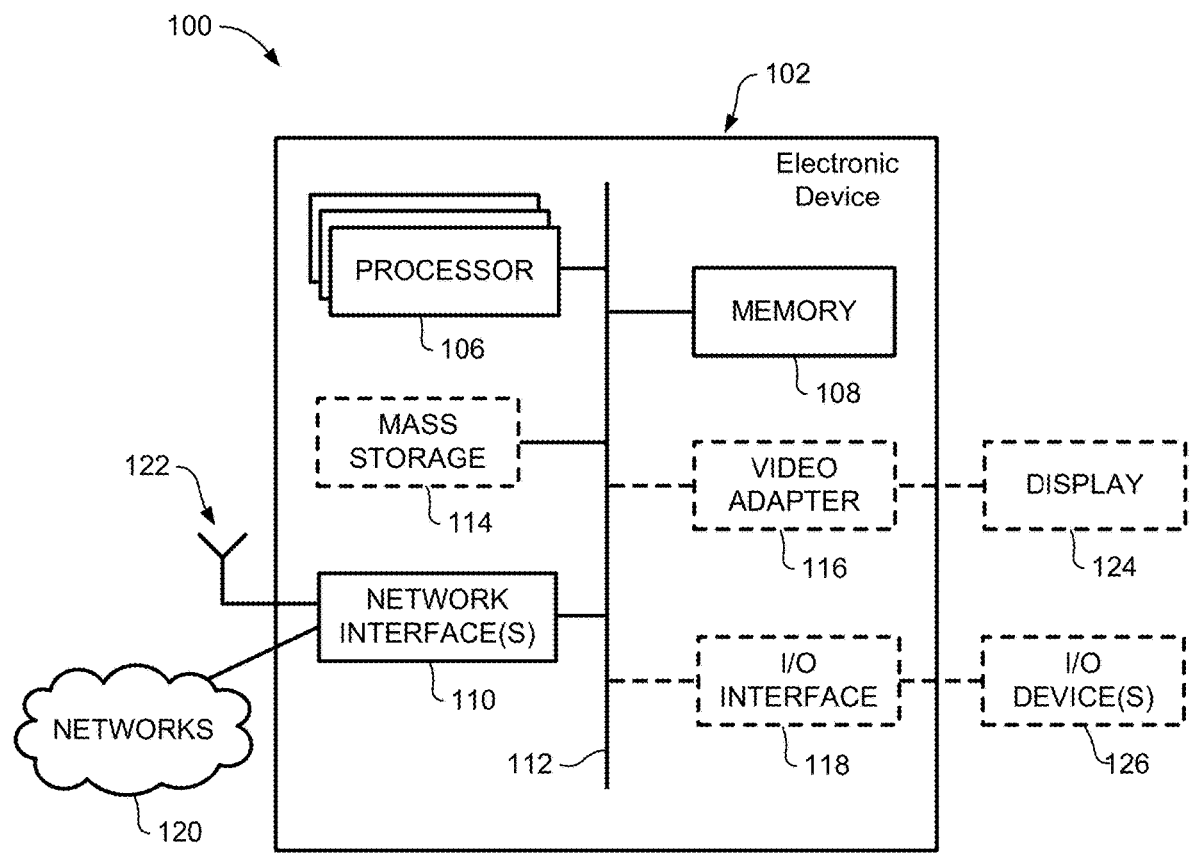
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device 2 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
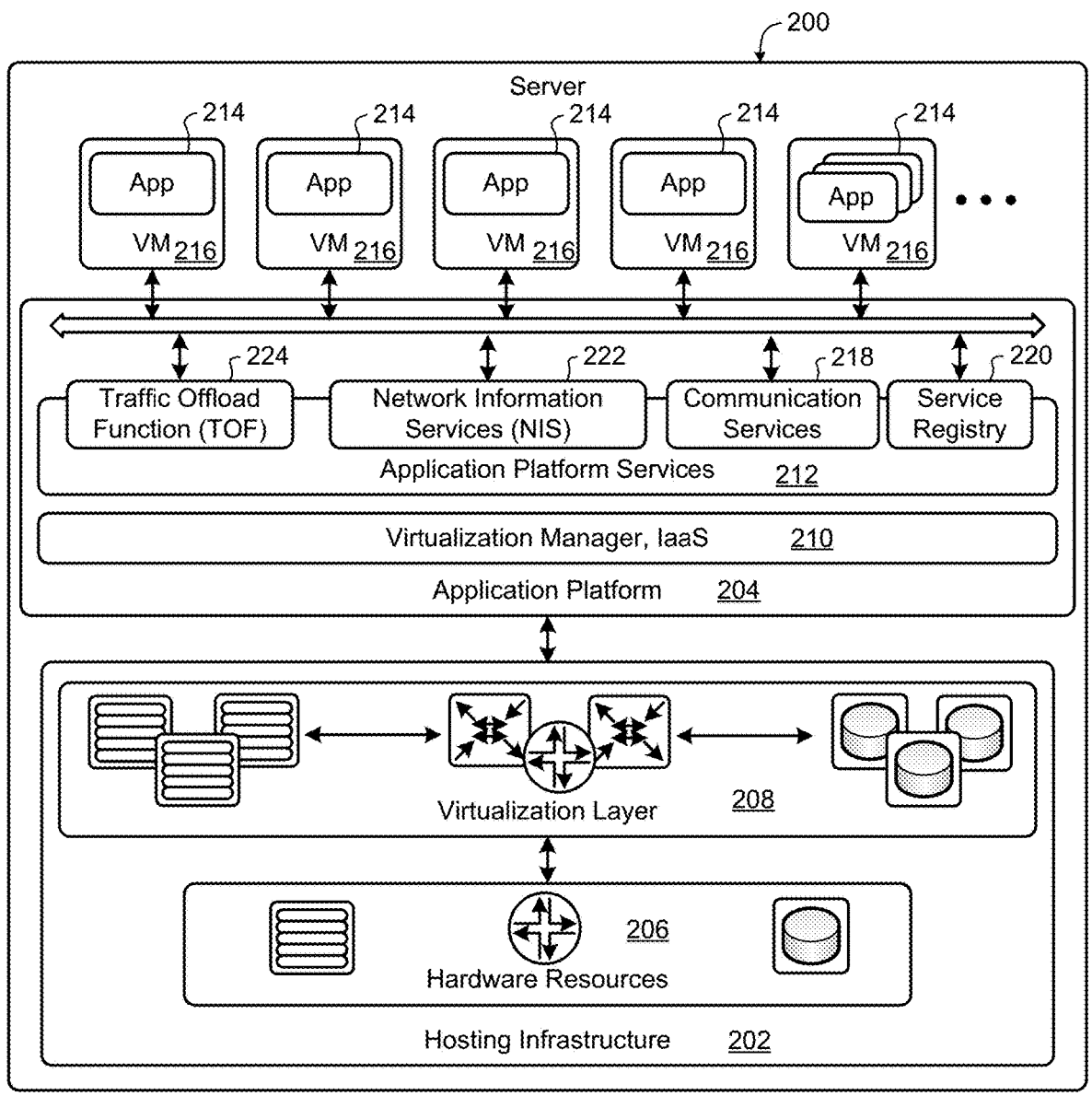
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a FIG. showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
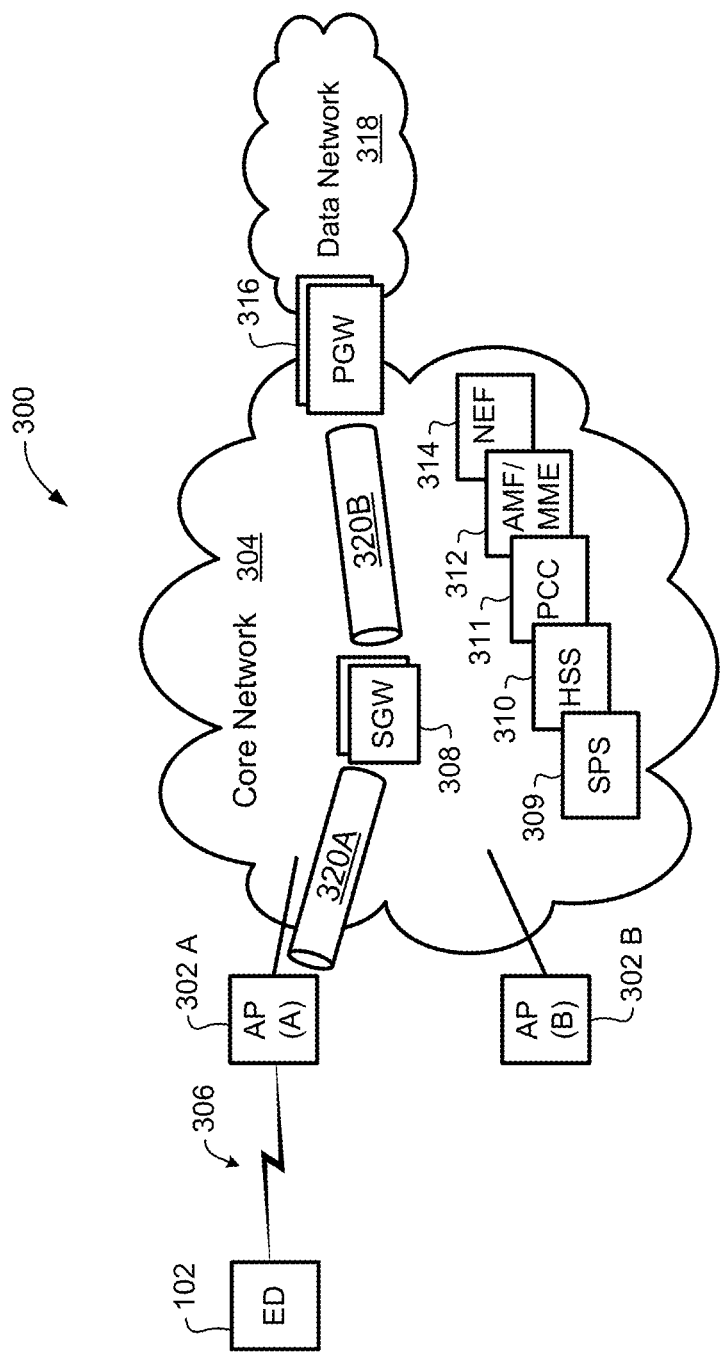
FIG. 3 is a block diagram illustrating elements of a mobile network in which embodiments of the present invention may be deployed.

FIG. 3 is a block diagram schematically illustrating an architecture of a representative network 300 usable in embodiments of the present invention. In some embodiments, the network 300 may be physically implemented as one or more computers, storage devices and routers (any or all of which may be constructed in accordance with the system 100 described above with reference to FIG. 1) interconnected together to form a Wide Area Network, and executing suitable software to perform its intended functions. In other embodiments, some or all of the elements of the network 300 may be virtualized entities instantiated by applications 214 executing in a server environment of the type illustrated in FIG. 2. For this reason, a figure showing the physical network hardware is not included in this specification. Rather, the block diagram of FIG. 3 shows a representative functional architecture of a network 300, it being understood that this functional architecture may be implemented using any suitable combination of hardware and software.

In the example of FIG. 3, the network 300 comprises a pair of access points 302A, 302B connected to a core network 304 which is configured to provide communications and connectivity services to electronic devices 102 connected to the access points 302A, 302B via links 306. In some embodiments, the links 306 may include wireless links between the ED 102 and an antenna 122 (not shown in FIG. 3) connected to network interfaces 110 of the AP 302. In embodiments deployed in a Centralized Radio Access network (CRAN) environment, the links 306 may encompass both wireless links and fronthaul connections to the access point 302. In the 4G or 5G networking environments, the access points 302A, 302B may be provided as eNodeB or gNB nodes, and the core network 304 may be an Evolved Packet Core (EPC) network providing network functions such as a Service Gateway (SGW) 308, Service Provider Server (SPS) 309, a Home Subscriber Server (HSS) 310, a Policy and Charging Control (PCC) function 311, an Access and Mobility Management Function (AMF) 312 or its predecessor Mobility Management Entity (MME), a Network Exposure Function (NEF) 314 and a Packet Gateway (PGW) 316. In some embodiments, the Packet Gateway 316 may be configured to provide connectivity to a data network 318 (such as the Internet, for example). It will be appreciated that in typical 4G or 5G networking environment, there may be more than one each of the SGW 308, SPS 309, HSS 310, PCC 311, AMF/MME 312, NEF 314 and PGW 316. In some embodiments, User-Plane packets to and from the ED 102 may be transported through GPRS Tunnel Protocol (GTP) tunnels 320A and 320B extending between an Access point 302 serving the ED 102 and the SGW 308, and between the SGW 308 and the PGW 316.

Figure 4:
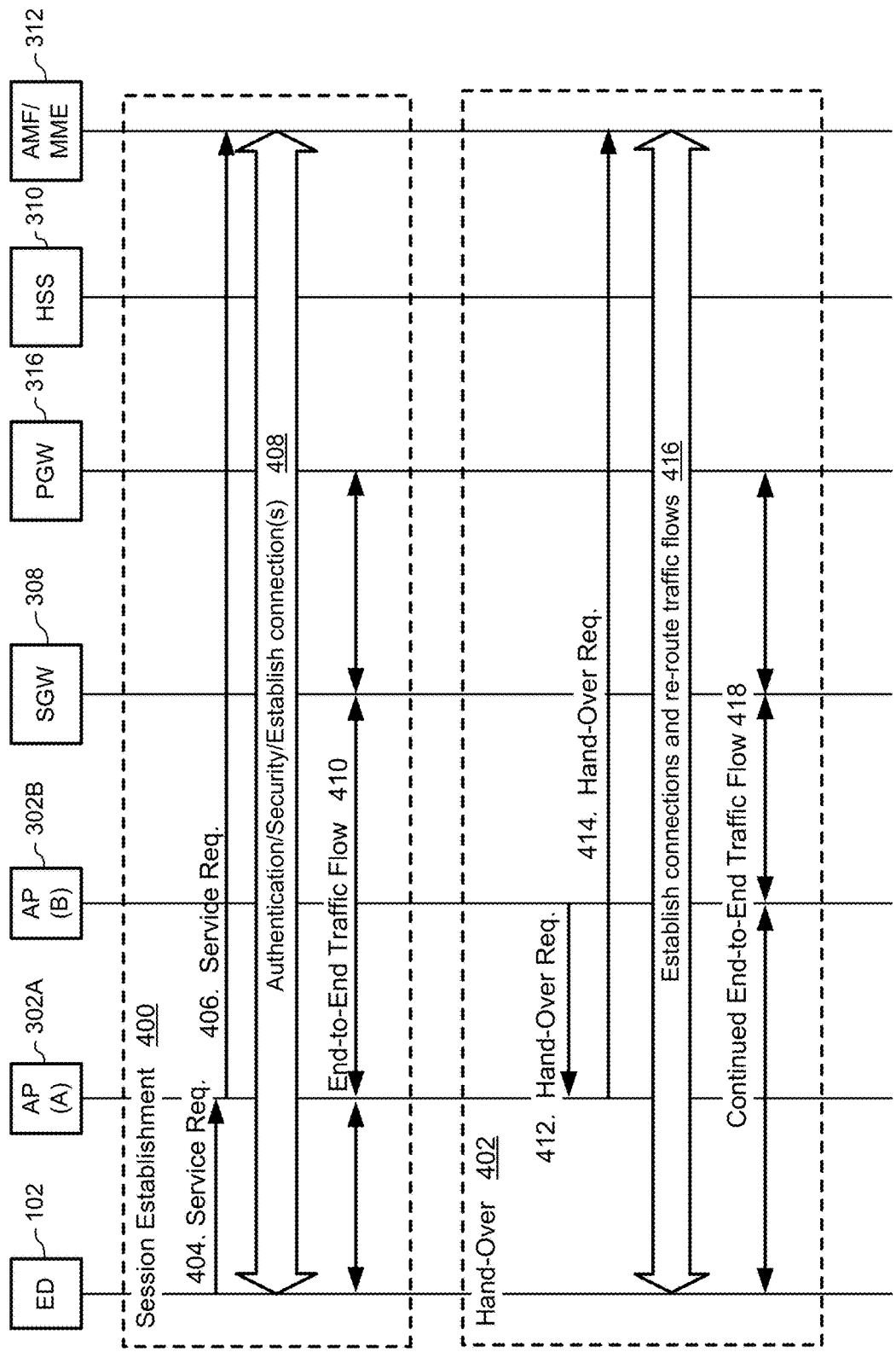
FIG. 4 is a message flow diagram illustrating example session establishment and Hand-Over processes.

FIG. 4 is a message flow diagram illustrating example session establishment 400 and Hand-Over 402 procedures of the type that may be implemented in the network 300 of FIG. 3.

As may be seen in FIG. 4, session establishment 400 typically begins with a service request 404 that is sent from the mobile electronic device (ED) 102 to an initial Access Point 302A. Upon receipt of the service request 404, the Access Point 302A may forward a corresponding service request (at 406) to the AMF/MME 312. Following receipt of the service request, the AMF/MME 312 may interact (at 408) with the HSS 310 to authenticate the service request and, upon successful authentication, with the SGW 308 and PGW 316 to establish connections (such as, for example GPRS Tunneling Protocol (GTP) tunnels) and associations needed to support the requested service. In some embodiments, the SGW 308 may interact with the HSS 310, PCC 311 and AMF/MME 312 to obtain service requirements, policies and security codes (such as encryption keys). In addition, the SGW 308 and PGW 316 may install Device Administration (DA) rules including ED-specific policy information, policy enforcement (policing) rules, traffic monitoring rules and statistic acquisition and reporting rules to enable the SGW 308 and PGW 316 to monitor traffic flows to and from the ED 102, enforce policies, report problems and facilitate customer billing etc.

Once connections and associations needed to support the requested service have been established, end-to-end traffic flows associated with the service session can begin (at 410). During the course of the service session, the SGW 308 and PGW 316 may operate in accordance with the installed DA rules to monitor the traffic flows to acquire relevant statistics, enforce policies, and generate reports to enable billing of the customer. For example, in a 4G and 5G environment, the SGW 308 and PGW 316 may monitor traffic flows through the GTP tunnels 320 established to carry User-Plane packets to and from the ED 102.

As is known in the art, during the course of the communications session, the ED 102 may move from a coverage area of the initial Access Point 302A and enter a coverage area of a new Access Point, such as access point 302B. At this time, the new access point 302B may initiate the Hand-Over procedure 402 by sending a Hand-Over request 412 to the initial Access Point 302A, which may respond to the Hand-Over request 412 by sending a corresponding Hand-Over request 414 to the AMF/MME 312. Following receipt of the Hand-Over request 414, the AMF/MME 312 may interact with the ED 102, the involved access points 302A and 302B and the SGW 308 to trigger establishment (at 416) of new connections with the new access point 302B, and re-route end-to-end traffic flows associated with the ED 102. Upon completion of this operation the end-to-end traffic flows to and from the ED 102 can continue (at 418), but in this case are being routed through the new access point 302B. The SGW 308 and PGW 316 may continue to monitor the traffic flows associated with the ED 102 to acquire relevant statistics, enforce policies, and generate reports to enable billing of the customer.

During and after the Hand-Over procedure 402, all of the end-to-end traffic associated with one or more service sessions of the ED 102 is routed through the SGW 308 and PGW 316, which maintain the Device Administration (DA) rules. Since the SGW 308 and PGW 318 do not change as the ED 102 moves from AP to AP during the course of any particular service session, they are often referred to as "anchor nodes". The SGW 308 typically handles routing changes as the ED 102 moves from one AP 302 A to another AP 302B, and so may be referred to as a "mobility anchor". In conventional network systems, all of the end-to-end traffic associated with a particular service session is routed through the mobility anchor node established at the beginning of the service session, even if a new AP 302B is associated with a different SGW or PGW that may be better positioned to handle the traffic than the initial anchor node established at the beginning of the service session.

So-called anchorless techniques that that enable communications connections to be established and rerouted during a communications session are known. An important characteristic of these techniques is that they do not rely on GTP tunnels 320 or anchor nodes, such as an SGW 308 or a PGW 316, to coordinate the establishment of connections and routing of session traffic. However, these techniques do not offer any mechanism by which the Device Administration functions can be performed without the anchor node. The present invention addresses this deficiency by enabling each access point in the network to perform the Device Administration functions normally performed by an anchor node.

Figure 5:
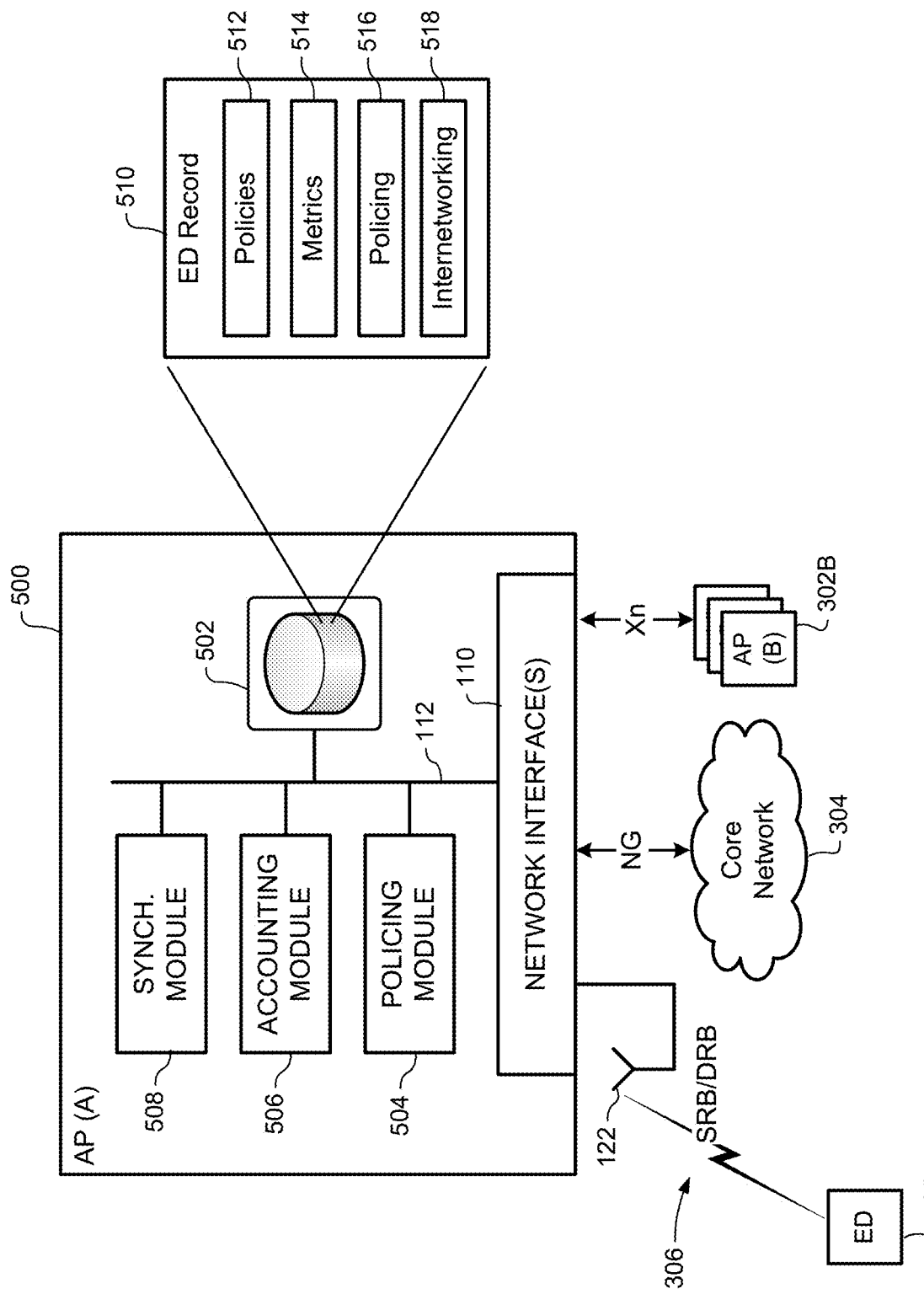
FIG. 5 is a block diagram illustrating elements of an access point in accordance with representative embodiments of the present invention.

FIG. 5 is a block diagram illustrating elements of a DA-enabled access point 500 in accordance with representative embodiments of the present invention. As with the APs 302A-B described above with reference to FIG. 3, the DA-enabled access point 500 may be may be provided as eNodeB or gNB nodes, which may be either constructed in accordance with the system 100 described above with reference to FIG. 1, or virtualized as one or more applications 214 executing in a virtual machine 216 instantiated in a server 200 as described above with reference to FIG. 2. As may be seen in FIG. 5, the DA-enabled access point 500 generally comprises an ED database 502, a Policing Module 504, an Accounting Module 506, and a Synchronization Module 508. In certain embodiments, the Policing, Accounting and Synchronization modules 504-508 may be combined together in any suitable combination.

In general terms, the ED database 502 stores device administration data for each ED 102 connected to the AP 500 via respective links 306. In some embodiments, the device administration data for each ED 102 may be stored in a respective ED record 510. It is contemplated that the format of the ED record 510 will be selected based on the specific session administration functions that need to be performed, and this, in turn, will tend to follow the functional capabilities of the network 300. For the specific example of a network 300 implemented under the 4G or 5G standards, the ED record 510 may be formatted into a Policies Portion 512, a Metrics Portion 514, a Policing Portion 516 and an Internetworking Portion 518.

The Policies Portion 512 may be configured to store policy information associated with the specific ED. For example, the policy information may include information defining a Service Level Agreement (SLA) associated with the specific ED, such as, for example, Quality of Service (QoS) parameters, latency specifications, usage limits, and rules governing interworking and roaming etc. In some embodiments, the policy information may include parameters that define one or more policies pertaining to the ED 102. In some embodiments, the policy information may include an identifier that may be used by the AP 500 to access the appropriate policy parameters from a remote location (such as the SPS 309, for example).

The Metrics Portion 514 may be configured to store at least one statistic and (optionally) other data related to the respective ED. For example, the Metrics Portion 514 may be used to store a respective identifier for each service session in which the ED is participating, and metrics related to each such services session. For example, for each service session, the AP 500 may measure a total utilization (e.g. number of packets sent or received, total bytes sent or received, etc.), an average latency, and an average bandwidth (e.g. packets or bytes per second). Different, or additional metrics may also be measured, as appropriate. The measured metrics may be stored in the Metrics Portion 514, and may be used to compute various statistics pertaining to the ED 102. These statistics may be stored in the Metrics Portion 514 and used by the Policing Module 504 to monitor compliance with one or more of the policies (such as usage limits) associated with the ED 102.

The Policing Portion 516, may be configured to store policing information associated with the specific ED 102. For example, the policing information may comprise rules that define actions to be taken to enforce the polices associated with the ED. For example, the policing information may define an action to be taken when the total usage of the ED exceeds a predetermined usage limit (which may be defined in the policy portion 512). For example, an SLA associated with the specific ED may define that the QoS is to be reduced to a predetermined level when the total usage (for example, packets or bytes sent and/or received) of the ED exceeds a predetermined usage limit. In this case, both the predetermined QoS level and the predetermined usage limit may be included in the policy information stored in the in the policy portion 512 of the ED record 510, while the specific policing rule (e.g. "On match (total utilization, utilization limit); Reduce the QoS") may be defined in the policing information stored in the Policing Portion 516 of the ED Record 510. In some embodiments, the policing information may include parameters that define one or more policing rules. In some embodiments, the policing information may include an identifier that may be used by the AP 500 to access the appropriate policing rule(s) from a remote location (such as SPS 309 and PCC 311, for example).

The Internetworking Portion 518 configured to store Internetworking information associated with the specific ED. For example, an SLA associated with the specific ED may define that the ED is permitted to access certain networks or use certain protocols, but not others. In addition, the SLA may define rules governing roaming, and such rules may be included in the Internetworking information.

In general terms, the Policing Module 504 operates to implement the respective policing rules associated with each ED 102. For example, the Policing Module 504 may use metrics and/or statistics stored in the Metrics Portion of the ED record 510 to implement policing rules defined by the policing information stored in the policing portion 516 of the ED record 510. In some embodiments, the Policing Module 504 may use the policing information stored in the policing portion 516 to access appropriate policing rules stored at a remote location, such as, for example, the HSS 310.

In general terms, the Accounting Module 506 controls the access point 500 to measure a predetermined set of metrics associated with traffic flows to and from each ED 102 connected to the AP 500 by links 306. Any suitable metrics may be measured. Example metrics may include, total numbers of packets or bytes traversing the AP (in either or both of the Uplink and Downlink directions) associated with service sessions of the ED, and mean latency experienced by packets associated with service sessions of the ED. In some embodiments, the Accounting Module 506 may also use the measured metrics to calculate statistics pertaining to one or more service sessions of the ED. For example, the total numbers of packets or bytes traversing the AP (in either or both of the Uplink and Downlink directions) associated with service sessions of the ED may be accumulated to calculate a usage of the ED over a specified time period such as, for example, a subscription billing period.

In general terms, the Synchronization Module 508 operates to synchronize administration data between DA-enabled access points 500 in the network 300. In that respect, it may be appreciated that the network 300 may include a plurality of access points, some of which may be DA enabled while others may not be DA-enabled. In some embodiments, the Synchronization Module 508 may be configured to synchronize administration data between those access points that are DA-enabled. In some embodiments, the Synchronization Module 508 may be further configured to synchronize administration data with any one or both of an SGW 308 and a PGW 316 (or other node, which may be an anchor node) associated with those access points that are not DA-enabled.

In some embodiments, the Synchronization Module 508 may instantiate device administration data (such as, for example, an ED record 510) for a specific ED 102 when that ED first establishes a wireless connection and requests services from the AP 500. For example, when AP 500 receives a first service request from an ED, the Synchronization Module 508 may instantiate a new ED record 510 for that ED 102. In some embodiments, the Synchronization Module 508 may populate one or more fields of device administration data with default information. For example, at least some fields of the Metrics Portion 514 of an ED record 510 may be assigned default values (such as for example "0") when the ED record 510 is instantiated. In some embodiments, one or more fields of device administration data may be populated with information obtained from another location (such as, for example, any one or more of the SPS 309, HSS 310, PCC 311 and AMF/MME 312). For example, Policy Information and Policing Rules applicable to the specific ED may be obtained from any one or more of the SPS 309, HSS 310, PCC 311 and AMF/MME 312.

In some embodiments, the Synchronization Module 508 may operate to transfer device administration data to another AP 500. For example, during a Hand-Over procedure involving a specific ED, the Synchronization Module 508 of the source AP may transfer device administration data of that ED to the target AP. In some embodiments, all of the device administration data held by the source AP for the specific ED may be transferred to the target AP. For example, the Synchronization Module 508 may send the entire ED record 510 to the target AP. In other embodiments, only a portion of the device administration data held by the source AP for the specific ED may be transferred to the target AP.

In some embodiments, the Synchronization Module 508 may operate to receive device administration data received from another AP 500. For example, during a Hand-Over procedure involving a specific ED, the Synchronization Module 508 of the target AP may receive device administration data of that ED from the source AP. In some embodiments, the Synchronization Module 508 may merge the received administration data into a local ED record 510 instantiated in the target AP for the specific ED. In other embodiments, the Synchronization Module 508 may receive an entire ED record 510 from the source AP, and install the received ED record for the specific ED into the ED database 502 as a local ED record that can be used by the target AP's Policing and Accounting modules 504 and 506. In some embodiments, the Synchronization Module 508 of the target AP may populate some fields of device administration data pertaining to a specific ED using information received from a source AP, and populate other fields of device administration data pertaining to that ED using information received from another location in the network 300, such as an SPS 309 for example.

Figure 6:
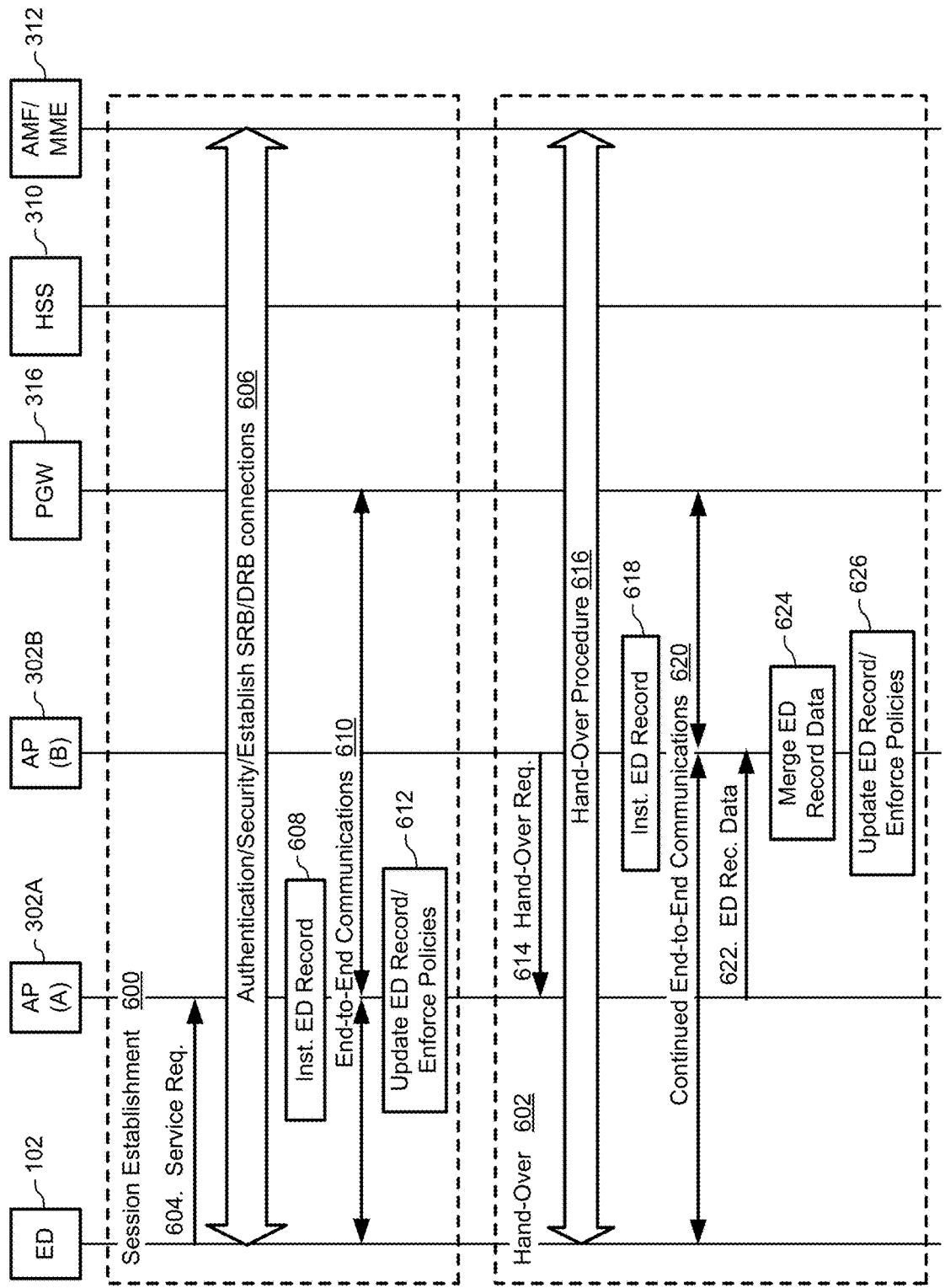
FIG. 6 is a message flow diagram illustrating example session establishment and Hand-Over processes in in accordance with a representative embodiment of the present invention.

FIG. 6 is a message flow diagram illustrating example session establishment 600 and Hand-Over 602 procedures in accordance with a representative embodiment of the present invention. The example of FIG. 6 assumes that the method is implemented in a network of the type contemplated by the 4G and 5G standards, but is anchorless, so that anchor nodes (such as an SGW 308 and PGW 316) and GTP tunnels 320 are not involved in setting up or managing communications sessions. Furthermore, while one or more PGWs 316 (which, in the example of FIGS. 6 and 7, may be simply a router) may be present to enable traffic flows to and from a packet network 318 (such as the internet), the lack of GTP tunnels 320 associated with the specific ED 102 means that device administrative functions cannot be located at either the SGW 308 the PGW 316.

As may be seen in FIG. 6, session establishment 600 typically begins with a service request 604 that is sent from the mobile electronic device (ED) 102 to an initial DA-enabled access point 500A. Upon receipt of the service request, the access point 500A may operate to establish (at 606) connections and associations needed to support the requested service. Known methods may be used to access the HSS 310 and AMF/MME 312 in order to authenticate the ED 102 and obtain service requirements and security codes (such as encryption keys), as well as to set up connections through the network to a PGW 316 for example. In addition, the Synchronization Module 508A of the initial DA-enabled access point 500A may instantiate (at 608) an ED record 510 to store device administration data pertaining to the ED 102. As noted above, at the time of instantiation, the ED record 510 may be populated with any suitable combination of default values and information obtained from another location in the network, such as the SPS 309 and PCC 311, for example.

Once connections and associations needed to support the requested service have been established, end-to-end traffic flows associated with the service session can begin (at 610). During the course of the service session, the Accounting Module 506A of the initial access point 500A may operate in accordance with the Policy information stored in the ED record 510 to update (at 612) the ED record 510 by monitoring the traffic flows to acquire relevant metrics and statistics, and generate reports to enable billing of the customer. At the same time, the Policing Module 504 may operate in accordance with the Policing rules stored in the ED record 510 to enforce the policies that pertain to the ED 102.

A new DA-enabled access point 500B may initiate the Hand-Over procedure 602 by sending a Hand-Over request 614 to the initial DA-enabled access point 500A. Alternatively, a Hand-Over request may originate from another source, the ED, for example. In response to the Hand-Over request 614, the two access points 500A and 500B may interact (at 616) with each other and network functions (such as, for example, any one or more of the SPS 309, HSS 310, AMF/MME 312 or NEF 314) to establish new connections through the new access point 500B, and re-route end-to-end traffic flows associated with the ED. In addition, the Synchronization Module 508B of the new DA-enabled access point 500B may instantiate (at 618) an ED record 510 to store device administration data pertaining to the ED 102. As noted above, at the time of instantiation, the ED record 510 may be populated with any suitable combination of default values and information obtained from another location in the network, such as the SPS 309 or PCC 311, for example. Once connections and associations needed to support the ED 102 have been established, end-to-end traffic flows to and from the ED 102 can continue (at 620).

In order to ensure continuity of policy enforcement, the respective Synchronization Modules 508 in the initial and new access points cooperate to update the ED record 510 instantiated in the new access point 500B. Thus, in the example of FIG. 6, the Synchronization Module 508A in the initial access point 500A sends (at 622) Device Administration Data pertaining to the ED 102 to the new access point 500B. In the example, of FIG. 6, the Device Administration Data sent to the new access point 500B is considered to represent a portion (but not all) of the content of the ED record 510 instantiated and maintained by the initial access point 500A. For example, the initial access point 500A may only send the contents of the metrics portion 514 of its ED record 510 to the new access point 500B. Upon receipt of the Device Administration Data pertaining to the ED 102 from the initial access point 500A, the Synchronization Module 508B in the new access point 500B may merge (at 624) the received Device Administration Data into its ED record 510 for the ED 102. Once this merge operation has been done, the ED record 510 maintained by the new access point 500B will contain the same information as the ED record 510 maintained by the initial access point 500A at the time of the Hand-Over. Accordingly, continuity of traffic monitoring and policy enforcement is maintained through the Hand-Over procedure. Thereafter, the Accounting Module 506B of the new access point 500B may operate in accordance with the Policy information stored in the ED record 510 to update (at 624) the ED record 510 by monitoring the traffic flows to acquire relevant metrics and statistics, and generate reports to enable billing of the customer. At the same time, the Policing Module 504B may operate in accordance with the Policing rules stored in the ED record 510 to enforce the policies that pertain to the ED 102.

As described above, the ED record 510 instantiated by the new AP 500B may be populated with any suitable combination of default values and information obtained from another location in the network. In general, two alternative scenarios may be described, as follows:

In one scenario, the ED record 510 may be populated with policy and policing information obtained from another location in the network. This scenario has an advantage in that the policy and policing information contained in the ED record 510 instantiated by the new AP 500B is accurate from the time of instantiation of the ED record 510. However, this approach also means that the delay incurred to instantiate the ED record 510 is increased due to the time required to request and obtain the policy and policing information.

In an alternative scenario, the ED record 510 may be populated with default policy and policing information that is subsequently updated based on the Device Administration Data received from the initial AP 500A. This scenario has an advantage in that the ED record 510 can be instantiated by the new AP 500B with minimum delay, because there is no need to request and receive policy and policing information from elsewhere in the network. However, this approach also means that the default policy and policing information may not accurately reflect the SLA associated with the ED, until the policy and policing information is updated based on the Device Administration Data received from the initial AP 500A.

If desired, hybrid scenarios may also be implement, whereby the policy and policing information contained in the ED record 510 instantiated by the new AP 500B is initially populated using a combination of information obtained from elsewhere in the network and default values that are subsequently updated based on the Device Administration Data received from the initial AP 500A.

Figure 7:
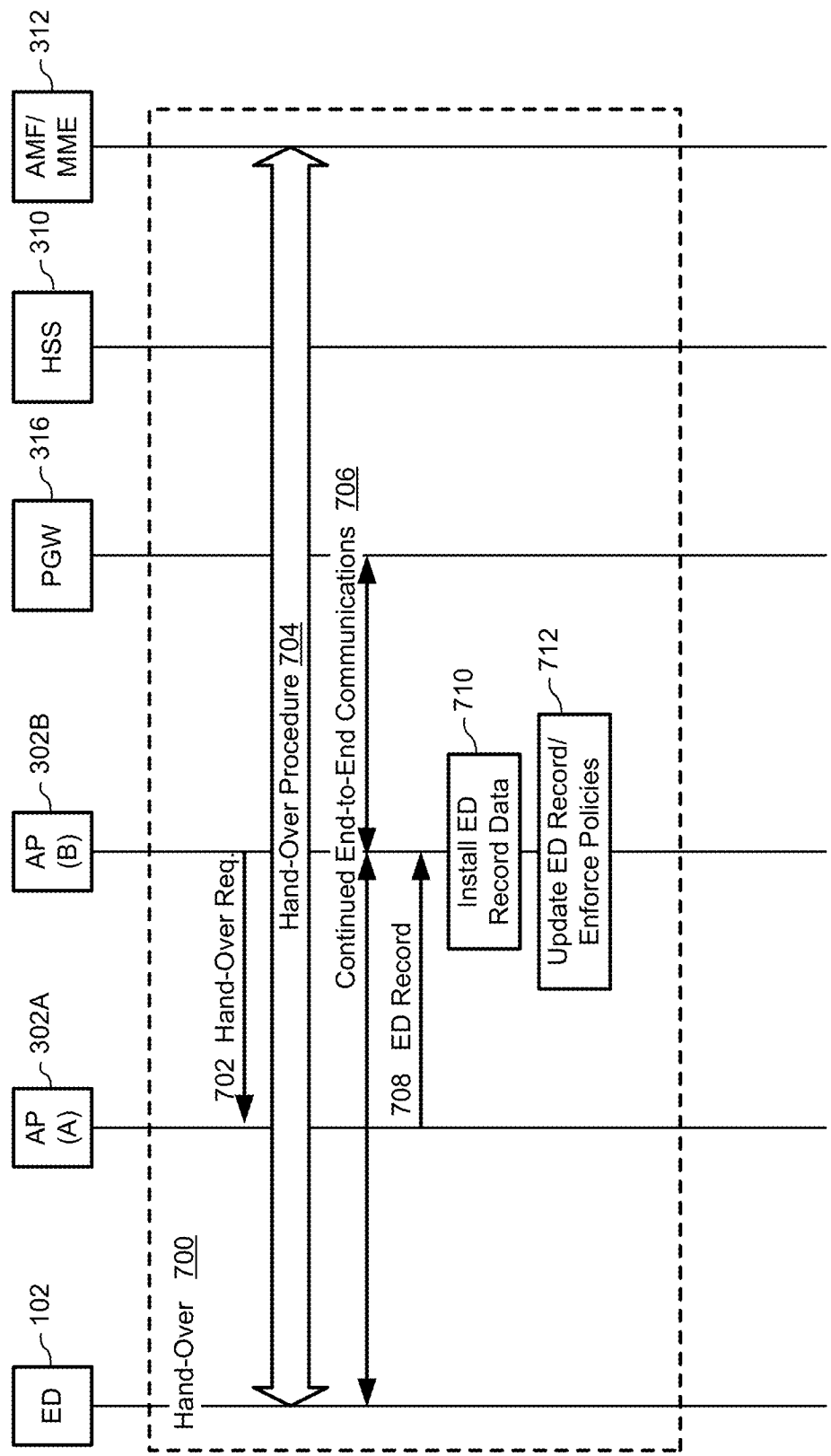
FIG. 7 is a message flow diagram illustrating an example Hand-Over process in in accordance with another representative embodiment of the present invention It will be noted that throughout the appended drawings, like features are identified by like reference numerals.

FIG. 7 is a message flow diagram illustrating a Hand-Over method in in accordance with another representative embodiment of the present invention. As may be seen in FIG. 7, a new DA-enabled access point 500B may initiate the Hand-Over procedure 700 by sending a Hand-Over request 702 to the initial DA-enabled access point 500A. In response to the Hand-Over request 702, the two access points 500A and 500B may interact (at 704) with each other and network functions (such as, for example, any one or more of the SPS 309, HSS 310, PCC 311, AMF/MME 312 or NEF 314) to establish new connections through the new access point 500B, and re-route end-to-end traffic flows associated with the ED. Once connections and associations needed to support the ED 102 have been established, end-to-end traffic flows to and from the ED 102 can continue (at 706).

In order to ensure continuity of policy enforcement, the respective Synchronization Modules 508 in the initial and new access points cooperate to transfer the ED record 510 from the initial access point 500A to the new access point 500B. Thus, in the example of FIG. 7, the Synchronization Module 508A in the initial access point 500A sends (at 708) a copy of the ED record 510 pertaining to the ED 102 to the new access point 500B. Upon receipt of the ED record 510 pertaining to the ED 102 from the initial access point 500A, the Synchronization Module 508B in the new access point 500B may install (at 710) the received ED record 510 into its database 502. Once this has been done, the new access point 500B will have a complete copy of the ED record 510 maintained by the initial access point 500A at the time of the Hand-Over. Accordingly, continuity of traffic monitoring and policy of enforcement is maintained through the Hand-Over procedure. Thereafter, the Accounting Module 506B of the new access point 500B may operate in accordance with the Policy information stored in the ED record 510 to update (at 712) the ED record 510 by monitoring the traffic flows to acquire relevant metrics and statistics, and generate reports to enable billing of the customer. At the same time, the Policing Module 504B may operate in accordance with the Policing rules stored in the ED record 510 to enforce the policies that pertain to the ED 102.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for execution in a first access node of a mobile network, the method comprising:
    receiving, by the first access node, a service request from an electronic device associated with a second access node in the mobile network;
    creating, by the first access node, a record associated with the electronic device, the record comprising information associated with at least one of: a policies rule associated with the electronic device, a metrics rule associated with the electronic device, a policing rule associated with the electronic device, and an internetworking rule associated with the electronic device;
    updating, by the first access node, the record associated with the electronic device in accordance with at least one of traffic received from the electronic device and traffic sent towards the electronic device;
    receiving, by the first access node, a second record associated with the electronic device from the second access node; and
    creating, by the first access node, a synchronized record associated with the electronic device, the synchronized record being synchronized between the first access node and the second access node, the synchronized record comprising information associated with at least one of: a policies rule associated with the electronic device, a metrics rule associated with the electronic device, a policing rule associated with the electronic device, and an internetworking rule associated with the electronic device, in accordance with the updated record and the received second record.

2. The method of claim 1 further comprising the step of transmitting towards the second access node in the mobile network a request to initiate a handover of association of the electronic device.

3. The method of claim 1 wherein the record associated with the electronic device is hosted within the first access node.

4. The method of claim 1 wherein the electronic device is a user equipment.

5. The method of claim 1 wherein creating the synchronized record comprises updating the updated record in accordance with data within the received second record.

6. The method of claim 1 wherein creating the synchronized record comprises updating the received second record in accordance with data within the updated record.

7. The method of claim 1 wherein the synchronized record further comprises at least one of:
    a roaming rule;
    a metering rule; and
    an accounting rule.

8. A method for execution at a first access node in a mobile network, the method comprising:
    receiving, by the first access node, a service request from an electronic device;
    creating, by the access node, a record associated with the electronic device, the record comprising information associated with at least one of: a policies rule associated with the electronic device, a metrics rule associated with the electronic device, a policing rule associated with the electronic device, and an internetworking rule associated with the electronic device;
    updating, by the first access node, the record associated with the electronic device in accordance with at least one of traffic received from the electronic device and traffic sent towards the electronic device;
    receiving, by the first access node, a handover request associated with the electronic device and a second access node in the mobile network;
    transmitting, by the first access node, towards the second access node the updated record associated with the electronic device, the updated record being synchronized between the first access node and the second access node, the updated record comprising information associated with at least one of: a policies rule associated with the electronic device, a metrics rule associated with the electronic device, a policing rule associated with the electronic device, and an internetworking rule associated with the electronic device.

9. The method of claim 8 wherein the handover request is received from one of the second access node and the electronic device.

10. The method of claim 8 wherein the record associated with the electronic device is hosted within the first access node.

11. The method of claim 8 wherein the electronic device is a user equipment.

12. The method of claim 8 wherein the updated record further comprises at least one of:
    a roaming rule;
    a metering rule; and
    an accounting rule.

13. An access node for use in a mobile network, the access node comprising:
- a network interface for communicating with other nodes within the mobile network;
- a radio access network interface for communicating with an electronic device;
- a memory for storing instructions; and
- a processor for, upon execution of instructions stored in the memory, configuring the access node to:
- upon receipt of a service request received from the electronic device over the radio access network interface, creating a record associated with the electronic device, the record comprising information associated with at least one of: a policies rule associated with the electronic device, a metrics rule associated with the electronic device, a policing rule associated with the electronic device, and an internetworking rule associated with the electronic device;
- updating the record associated with the electronic device in accordance with at least one of traffic received from the electronic device and traffic sent towards the electronic device; and
- transmitting towards a second access node the updated record associated with the electronic device, the updated record being synchronized between the first access node and the second access node, the updated record comprising information associated with at least one of: a policies rule associated with the electronic device, a metrics rule associated with the electronic device, a policing rule associated with the electronic device, and an internetworking rule associated with the electronic device, the second access node identified in a received handover request associated with the electronic device.

14. The access node of claim 13 wherein the handover request is received from one of the second access node and the electronic device.

15. The method of claim 13 wherein the updated record further comprises at least one of:
- a roaming rule;
- a metering rule; and
- an accounting rule.

* * * * *

UNITED STATES PATENT AND TRADEMARK OFFICE
CERTIFICATE OF CORRECTION

PATENT NO. : 10,972,904 B2
APPLICATION NO. : 16/148734
DATED : April 6, 2021
INVENTOR(S) : Mehdi Arashmid Akhavain Mohammadi Page 1 of 1

It is certified that error appears in the above-identified patent and that said Letters Patent is hereby corrected as shown below:

In the Specification

Column 5, Line 54, "example, the information provided by MS 222 may be used" should read --example, the information provided by NIS 222 may be used--

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*